United States Patent [19]
Ashida et al.

[11] Patent Number: 4,959,456
[45] Date of Patent: Sep. 25, 1990

[54] MULTISTAGE PROCESS FOR PRODUCING POLYCARBONATE FROM OLIGOMER

[75] Inventors: Takashi Ashida; Noriyuki Kunishi; Koji Yamamoto, all of Ichihara, Japan

[73] Assignee: Idemitsu Petrochemical Co., Ltd., Tokyo, Japan

[21] Appl. No.: 344,602

[22] Filed: Apr. 28, 1989

[30] Foreign Application Priority Data

Apr. 29, 1988 [JP] Japan ................................. 63-106806

[51] Int. Cl.$^5$ .............................................. C08G 64/38
[52] U.S. Cl. ..................................... 528/371; 526/65; 528/198; 528/370
[58] Field of Search ....................... 528/371, 370, 198; 526/65

[56] References Cited

U.S. PATENT DOCUMENTS 3,386,954  6/1968  Schnell et al. ...................... 528/371

Primary Examiner—Harold D. Anderson
Attorney, Agent, or Firm—Antonelli, Terry, Stout & Kraus

[57] ABSTRACT

A process for producing polycarbonate from a polycarbonate oligomer and a phenol compound, comprising introducing the oligomer, caustic alkali and the phenol compound in the first reaction zone where polymerization is carried out to produce polycarbonate having a viscosity average molecular weight of 3,000 to 15,000, and then introducing the reaction mixture containing the above polycarbonate into the second reaction zone where polymerization is carried out while controlling the alkali concentration to the range of 0.05 to 0.7N by regulating caustic alkali supplied.

8 Claims, No Drawings

MULTISTAGE PROCESS FOR PRODUCING POLYCARBONATE FROM OLIGOMER

BACKGROUND OF THE INVENTION

1. Field of the Invention

The present invention relates to a process for producing polycarbonate and more particularly to a process for efficiently producing polycarbonate excellent in tone and heat resistance.

2. Description of Related Arts

In general, polycarbonate is produced by reacting a polyhydric phenol, such as dihydric phenol and more hydric phenol, with phosgene in the presence of an alkali. Particularly on a commercial scale, polycarbonate has been efficiently produced by continuous stirred tank-reactor process.

This process has a disadvantage in that polycarbonate having a number of hydroxyl groups as terminal groups is liable to contain an impurity because of its great affinity to water during the washing step, thereby causing problems such as poor tone and poor heat resistance of the polycarbonate product. Moreover, the molecular weight of polycarbonate is not uniform. Polycarbonate containing a relatively large amount of low molecular weight products is liable to stick to the mold at the time of molding, which is responsible for poor tone, and polycarbonate having a wide distribution of molecular weight is responsible for poor heat resistance. If the alkali concentration at the initial stage of the reaction is increased in order to shorten the reaction time, the chloroformate group of polycarbonate oligomer is markedly decomposed. Moreover, the above process has serious problems in the commercial practice thereof that the resistance time is long and a long time is needed in changing the grade of polycarbonate to be produced.

An improved method to overcome the above problems is disclosed in Japanese Patent Publication No. 36554/1977. In this method, an attempt to narrow the molecular weight and to depress the decomposition reaction is made by using a tubular reactor. This improved method, however, is still unsufficiently satisfactory although the object is attained to a certain extent.

SUMMARY OF THE INVENTION

An object of the present invention is to provide a process for efficiently producing polycarbonate having improved tone and heat resistance by decreasing the number of terminal hydroxyl groups to improve cleaning properties and by decreasing the amount of low molecular weight polymers.

It has now been found that the above object is attained by controlling the alkali concentration in the first reaction zone to a level lower than in the conventional reaction and controlling the viscosity average molecular weight at the outlet of the first reaction zone to 3,000 to 15,000, and further supplying an alkali to the second reaction zone.

The present invention relates to a process for producing polycarbonate by reacting a polycarbonate oligomer and a phenol compound in the presence of caustic alkali, which process comprises introducing the polycarbonate oligomer, the caustic alkali and the phenol compound, the equivalent ratio of the caustic alkali to the hydroxyl group of the phenol compound (alkali/hydroxyl group) being 0.9 to 1.8, in the first reaction zone where they are polymerized to produce polycarbonate having a viscosity average molecular weight of 3,000 to 15,000, and then introducing the reaction mixture containing the polycarbonate as obtained in the first reaction zone into the second reaction zone where polymerization is continued while maintaining the caustic alkali concentration at 0.05 to 0.7N by supplying the caustic alkali.

DESCRIPTION OF PREFERRED EMBODIMENTS

In the process of the present invention, chloroformic acid ester (polycarbonate oligomer) is used as the starting material of the polymerization reaction. This polycarbonate oligomer can be as obtained by mixing a solution of at least one of polyhydric, such as dihydric or trihydric, phenols dissolved in an aqueous alkali solution with a solution of a monohydric phenol dissolved in an aqueous alkali solution or a solvent as a molecular weight modifier, and reacting the resulting mixture with phosgene in a solvent. A number average molecular weight of the polycarbonate oligomer in the present invention is 300 to 2,500, and preferably 500 to 1,500.

Dihydric phenols to be used in the present invention include various bisphenols. Of these, 2,2-bis(4'-hydroxyphenyl)propane (hereinafter referred to as bisphenol A) is particularly preferred. In addition, those resulting from partial or full substitution of bisphenol A with other dihydric phenols can be used. Dihydric phenols other than bisphenol A include hydroquinone, 4,4'-dihydroxydiphenyl, bis(4-hydroxyphenyl)alkane, bis(4-hydroxyphenyl)cycloalkane, bis(4-hydroxyphenyl)sulfide, bis(4-hydroxyphenyl)sulfoxide, bis(4-hydroxyphenyl)sulfone, bis(4-hydroxyphenyl)ketone, bis(4-hydroxyphenyl)ether, 2,2-bis(3',5'-dimethyl-4'-hydroxyphenyl)propane, and halogenated bisphenols such as 2,2-bis(3',5'-dibromo-4'-hydroxyphenyl)propane.

Polyhydric, such as trihydric or more, phenols to be used in the present invention include phloroglucinol, phloroglucide, 4,6-dimethyl-2,4,6-tri(4'hydroxyphenyl)heptene-2,4,6-dimethyl-2,4,6-tri(4'-hydroxyphenyl)heptane, 1,3,5-tri(4'-hydroxyphenyl)-benzene, 1,1,1-tri(4'-hydroxyphenyl)ethane, 2,2-bis(4,4-bis(4'-hydroxyphenyl)cyclohexyl)-propane, 2,6-bis(2'-hydroxy-3'-methyl-benzyl)-4-methylphenol, 2,6-bis(2'-hydroxy-3'-isopropyl-benzyl)-4-isopropylphenol, bis(2-hydroxy-3-(2'-hydroxy-3'-methyl-benzyl)-4-methylphenyl)methane, tetra(4-hydroxyphenyl)methane, tri(4-hydroxyphenyl)phenylmethane, trisphenol, bis(2,4-dihydroxyphenyl)ketone, 1,4'-bis(4',4'-dihydroxytriphenyl-methyl)benzene and the like. These may contain a halogen-substituted group or groups. These may be used as mixtures thereof.

Monohydric phenols to be used in the present invention include phenol, alkyl substituted groups (containing 1 to 4 carbon atoms)-containing alkylphenols, particularly p-cresol and p-tert-butylphenol, and the like. These may be substituted with halogen.

In accordance with the process of the present invention, the polycarbonate oligomer produced from the starting materials as described above and a solvent are previously cooled in order to control the reaction temperature. Then a solution of the phenol compound dissolved in an aqueous alkali solution and a catalyst are introduced in the first reaction zone. The viscosity average molecular weight of the polycarbonate in the outlet is controlled to 3,000 to 15,000 and preferably 5,000 to 12,000. Then the polycarbonate is introduced in the second reaction zone and at the same time, caustic alkali is supplied at a controlled concentration.

To increase the efficiency of the reaction and further to obtain a polymer having the desired properties, it is important to adjust the temperature of the reaction mixture, preferably to 10° to 50° C. If the temperature is less than 10° C., the rate of reaction greatly drops. On the other hand, if it is more than 50° C., the catalyst undergoes a side reaction, causing a decrease in the rate of reaction, and by-products reduce the quality of the desired product.

In order to increase the rate of reaction, the solvent may be introduced in the second reaction zone instead of in the first reaction zone.

In the first reaction zone, therefore, the reaction is allowed to proceed only to the extent corresponding to the necessary amount of caustic alkali converting the phenol compound into its alkali salt. Thus the decomposition of the chloroformate group (—COCOl) is inhibited, and a high concentration of caustic alkali supplied to the second reaction zone increases the rate of reaction, thereby shortening the reaction time. Moreover, since the proportion of polymers terminated with a monohydric phenol is high (that is, the amount of residual hydroxyl groups is small), the proportion of low molecular weight polymers is decreased and, therefore, impurities can be easily removed at the subsequent washing step and there can be obtained a polymer having excellent heat resistance and tone.

As the caustic alkali to be used in the present invention, strongly basic hydroxides, e.g. caustic soda or caustic potash can be used. The concentration of caustic alkali to be introduced in the first reaction zone is sufficient to be such as to make the phenol compound soluble in water as its alkali salt, and the equivalent ratio of alkali to hydroxyl group (alkali/OH ratio) is in the range of 0.9 to 1.8, preferably 0.95 to 1.2.

The solvent to be used in the present invention is one sufficiently capable of dissolving the above polycarbonate oligomer and high molecular weight polycarbonate. For example, chlorinated hydrocarbons such as methylene chloride, tetrachloroethane, 1,2-dichloroethylene, chloroform, trichloroethane, dichloroethane or chlorobenzene, dioxane, tetrahydrofuran, and acetophenone can be used. These can be used alone or in combination with each other.

In the present invention, the molecular weight of the polycarbonate in the outlet of the first reaction zone is, as described above, controlled to 3,000 to 15,000. Although the controlling method is not critical, the following methods are preferably employed.

(1) Method using Strongly Stirring Line Mixer

Pipe Line Homomixer and Homomic Line Flow (both produced by Tokushu Kika Kogyo Co., Ltd.), Multi Line Mixer (produced by Satake Chemical Equipment Mfg., Ltd.), Komatsu Disintegrator (produced by Komatsu Zenoah Co., Ltd.), and a centrifugal pump having a predetermined power and so forth are used, and the molecular weight is controlled with a stirring force (number of revolutions) and a residence time. In connection with the stirring force, the power per unit flow is sufficiently in the range of 0.05 to 4 kW hr/m$^3$.

In this method, a pot may be fitted to the outlet in order to provide the desired residence time.

(2) Method using Orifice Mixer or Static Mixer

An orifice mixer with an orifice plate inserted in a piping or High Mixer (produced by Toray Co., Ltd.), Sulzer Mixer (produced by Sumitomo Heavy Industries, Ltd.), or Kenics Static Mixer (produced by Noritake Co., Limited), e.g. is used to adjust the pressure drop to 1 to 20 kg/cm$^2$, and the molecular weight is controlled by the pressure drop and residence time.

A recycle system may be employed to secure the pressure drop and residence time.

(3) Method using Stirring Vessel

A stirring vessel provided with, as a stirring blade, a Pfaudler blade, a turbine blade, a paddle blade, or a Max-Blend blade (produced by Sumitomo Heavy Industries, Ltd.) is used, and the molecular weight is controlled by the stirring force (number of revolutions) and the residence time (vessel volume). The stirring force is controlled so that the power per unit volume is more than 0.5 kW/m$^3$.

(4) Method with Temperature

In addition to the means described in (1) to (3), a jacket, a heating/cooling tube, and so forth are fitted to adjust the reaction temperature. In this case, if the temperature of the reaction mixture is less than 10° C., the rate of reaction is markedly decreased. On the contrary, if it is more than 50° C., the rate of reaction is decreased by side reactions of the catalyst and so forth. Thus the temperature is preferably controlled within the range of 10° to 50° C.

(5) Method using Catalyst

In addition to the means described in (1) to (4), the rate of reaction is controlled by the amount of the catalyst. As the catalyst, tertiary amine, quaternary ammonium salts and the like can be used.

The molecular weight can be controlled by combining the reactors used in methods (1) to (3) as described above.

In accordance with the process of the present invention, a reaction mixture containing polycarbonate having a molecular weight of 3,000 to 15,000 as obtained in the outlet of the first reaction zone is introduced into the second reaction zone, and at the same time, caustic alkali is supplied to the second reaction zone and mixed with the reaction mixture. In this second reaction zone, any apparatus can be used as long as it is capable of dispersing a high concentration of caustic alkali, thereby forming a uniform system in concentration. In general, the reactors listed in (1) to (3) above are preferably used. More preferably, in order to remove the heat of reaction, a cooling unit, e.g. a jacket or a cooler is provided.

The concentration of caustic alkali to be used in the second reaction zone is preferably 10 to 50% by weight. Caustic soda with a concentration falling within the above range is supplied so that the concentration of caustic alkali in the aqueous layer of the reaction mixture is 0.05 to 0.7 normal(N).

Use of such a high concentration of caustic alkali increases the rate of reaction. As a result, the reaction time is shortened, the amount of polymer terminated with the monohydric phenol is increased (the amount of residual hydroxy terminal group is decreased), and there can be obtained a polymer having a small amount of low molecular weight polymer.

In the process of the present invention, the reaction is completed in the second reaction zone depending on the capacity of the apparatus to be used in the second reaction zone. However, if necessary, the third reaction zone or subsequent reaction zones may be provided in combination to complete the reaction by the use of e.g. a stirring vessel, a multi-stage column type stirring vessel, a non-stirring vessel, a static mixer, a line mixer, an orifice mixer or a piping. Polycarbonate as a final product in the present invention has a viscosity average molecular weight of 10,000 to 50,000, and preferably 14,000 to 35,000.

The process of the present invention can be carried out continuously or batchwise. In continuous polymerization, the first reaction zone and the second reaction zone are formed in different reactors. In batchwise polymerization, polymerization is carried out in a reactor as the first reaction zone by adding caustic alkali in such a manner that the initial amount of caustic alkali supplied is the minimum amount necessary to dissolve the phenol compound (more specifically, in such an amount that the equivalent ratio of alkali in the caustic alkali to hydroxyl group in the phenol is 0.9:1 to 1.8:1). At a stage that the molecular weight of polymer reaches 3,000 to 15,000, a high concentration of caustic alkali is supplied to the same reactor as above, thereby setting the conditions for the second reaction zone as specified above (more specifically, controlling a caustic alkali concentration within a range of 0.05 to 0.7N). That is, the above specified conditions in the first and second reaction zones can be formed by controlling the conditions in the same reactor.

In accordance with the process of the present invention, the number of hydroxy terminal groups in the polymer can be decreased, the molecular weight distribution is narrow and the low molecular weight polymer content is small and, therefore, there can be obtained polycarbonate in which washing properties are improved and the rate of decomposition of the chloroformate group of oligomer is low. Since, as described above, the decomposition reaction is prevented, the efficient use of the starting material is increased and the production cost can be decreased.

Accordingly the process of the present invention permits efficient production of polycarbonate excellent in tone and physical properties such as heat resistance.

The present invention is described in greater detail with reference to the following examples.

PREPARATION EXAMPLE (Production of Oligomer)

40 L (L=liter)/hr of a 14.5 wt % aqueous solution of bisphenol A in a 6 wt % aqueous caustic soda solution, 0.35 L/hr of a methylene chloride solution containing 25 wt % of p-tert-butylphenol as a molecular weight modifier, and 18.5 L/hr of methylene chloride as a solvent were introduced in a tubular reactor (inner diameter: 6 mm; length: 30 m) dipped in a cooling vessel maintained at 20° C., and phosgene was blown thereinto at a flow rate of 3.8 kg/hr.

The reaction mixture in the outlet was introduced into a 30-liter vessel type reactor along with 0.08 L/hr of a 4 wt % aqueous solution of triethylamine as a catalyst and 2 L/hr of a 6 wt % aqueous solution of caustic soda and reacted. The reaction mixture was separated in a stationary separation vessel, and the resulting methylene chloride layer was used as the polycarbonate oligomer. This oligomer had a number average molecular weight of 890 and a chloroformate group concentration of 0.7N.

EXAMPLE 1

20 L/hr of the polycarbonate oligomer as obtained in Preparation Example, 11.5 L/hr of a 14.5 wt % aqueous solution of bisphenol A in a 6 wt % aqueous solution of caustic alkali (Na/OH equivalent ratio=1.03/1), 0.04 L/hr of a 4 wt % aqueous solution of triethylamine, and 13 L/hr of methylene chloride were introduced in a 0.3-liter T.K pipe line homomixer Model 2SL (first reactor as the first reaction zone, produced by Tokushu Kika Kogyo Co., Ltd.) provided with turbine blades (diameter: 43 mm and 48 mm), and polymerization was carried out at 3,000 rpm. The viscosity average molecular weight of the polycarbonate in the outlet was 9,200.

Subsequently, in a Sulzer mixer (inner diameter: 9.2 mm; length: 230 mm; containing 14 elements, produced by Sumitomo Jukikai Co., Ltd.) as the second reactor of the second reaction zone, the polymer solution in the outlet of the first reactor and 0.8 L/hr of a 25 wt % aqueous solution of caustic soda were introduced. The concentration of caustic soda in the aqueous layer of the reaction mixture from the outlet of the second reactor was 0.28N.

As the third reactor to complete the reaction, a jacketed column type stirring vessel with three 50-liter paddle blades was used, and polymerization was carried out therein. Cooling water maintained at 15° C. was passed through the jacket, and the outlet temperature of the polymer solution was set at 30° C. This polymer solution was subjected to alkali, acid and water washing to obtain a transparent polymer solution.

The concentration of $Na_2CO_3$ in the aqueous layer of the polymer solution as produced by decomposition of the chloroformate group was as low as 0.03 mol/L, and the viscosity average molecular weight was 30,500 and the molecular weight distribution (Mw/Mn) was 2.11.

The polymer solution after washing was concentrated, powdered by the use of a kneader, and thoroughly dried to obtain flakes. The low molecular weight polymer content of the flakes as determined by acetone extraction was 1.4 wt % by weight. The dried flakes were granulated by the use of an extruder and molded into a plate. The yellow index (YI) of the plate was 2.6.

EXAMPLE 2

Polymerization was carried out in the same manner as in Example 1 exception that the same Sulzer mixer as in Example 1 was used as the first reactor and the polymer solution was recycled at a rate of 45 L/hr. The viscosity average molecular weight was 6,400. As the second reactor, a jacketed orifice mixer comprising a ¾ inch diameter pipe having therein two orifice plates with three holes in each (diameter: 0.8 mm) inserted in a pipe was used. Using the same third reactor as in Example 1, polymerization was completed. The results are shown in Table 1.

EXAMPLE 3

Reaction was carried out in the same manner as in Example 1 except that a jacketed 20-liter stirring vessel with a Pfaudler blade (diameter: 260 mm) was used as the first reactor and operated at 290 rpm. Cooling was carried out by passing cooling water at 15° C. through the jacket. The viscosity average molecular weight was 9,700. As the second reactor, the same line mixer as the first reactor of Example 1 was used, and polymerization was carried out at 4,000 rpm. The reaction was completed using a 30-liter vertical pot with no stirring blade as the third reactor. The results are shown in Table 1.

EXAMPLE 4

Polymerization in the first reaction zone was carried out in the same manner as in Example 1 except that the number of revolutions was set at 1,500 rpm and the aqueous triethylamine solution was supplied at a rate of 0.08 L/hr. The viscosity average molecular weight was 10,600.

Then, as the second reactor, the same orifice mixer as used in Example 2 was used, and the reaction was completed using, as the third reactor, the same column type stirring vessel as used in Example 1.

The results are shown in Table 1.

EXAMPLE 5

The reaction was carried out batchwise in the same first reactor as used in Example 3 at 290 rpm and while passing cooling water at 15° C. through the jacket. In connection with the amounts initially introduced into the reacter, the oligomer was 8 L, the aqueous caustic soda solution of bisphenol A was 4.6 L, the methylene chloride was 5.2 L, and the 4 wt % aqueous triethylamine solution was 0.016 L. After 10 minutes, 0.28 L of a 25 wt % aqueous solution of caustic soda was supplementarily introduced. The viscosity average molecular weight before introduction of the aqueous caustic soda solution was 11,100.

EXAMPLE 6

After passage through the first reactor under the same conditions as in Example 1, the polymer solution and 0.8 L/hr of a 25 wt % aqueous solution of caustic soda were introduced into a line mixer of the same type as the first reactor, and polymerization was completed at 3,000 rpm. The polymer solution was subjected to alkali, acid and water washing to obtain a transparent polymer. The viscosity average molecular weight of the polymer was 30,100. The concentration of $Na_2CO_3$ in the aqueous layer of the polymer solution as produced by decomposition of the chloroformate group was 0.03 mol/L.

COMPARATIVE EXAMPLE 1

Polymerization was carried out under the same conditions as in Example 1 except that the number of revolutions of the first reactor was set at 500 rpm. The results are shown in Table 1.

COMPARATIVE EXAMPLE 2

Polymerization was carried out under the same conditions as in Example 1 except that the number of revolutions of the first reactor was set at 4,500 rpm and the amount of triethylamine supplied was changed to 0.12 L/hr. The results are shown in Table 2.

COMPARATIVE EXAMPLE 3

Polymerization was carried out under the same conditions as in Example 1 except that the amount of the 25 wt % aqueous caustic soda solution supplied was changed to 0.3 L/hr. The results are shown in Table 2.

COMPARATIVE EXAMPLE 4

Polymerization was carried out under the same conditions as in Example 1 except that the amount of the 25 wt % aqueous caustic soda solution supplied was changed to 1.6 L/hr and it was supplied to the first reactor. The results are shown in Table 2.

COMPARATIVE EXAMPLE 5

Polymerization was carried out in the same manner as in Example 1 except that an aqueous solution of bisphenol A as a starting material was heated to 40° C. and supplied to the same stirring vessel (first reactor as the first reaction zone) as used in Example 3. Polymerization was carried out under pressure at 340 rpm without cooling the stirring vessel.

Then, polymerization was carried out under pressure at 4,000 rpm by the use of the same line mixer as in Example 1, and the reaction was completed using, as the third reactor, the same column type stirring vessel as used in Example 1. The results are shown in Table 2.

COMPARATIVE EXAMPLE 6

The reaction was carried out batchwise in the same manner as in Example 5 except that the total caustic soda was supplied at the initial stage. The results are shown in Table 2.

In the above examples and comparative examples, the power consumed for stirring per unit flow rate (Pf) was calculated from the following equation:

$$Pf(kW\ hr/m^3) = \frac{Np \times \rho \times n^3 \times d^5}{102 \times gc \times F}$$

where $\rho$ is a liquid density (kg/m$^3$), n is a number of revolutions (rps), Np is a power number, d is a turbine diameter (m), gc is a gravitational conversion factor (kg m/kg sec$^2$), and F is the total flow amount (m$^3$/hr).

When stirring blades are provided at multi-stages, Pf is indicated as the sum of power required for each blade.

In the Pipe Line Homomixer used in the present invention, stirring blades were provided at two stages, the power number of the first turbine blade was 1.4, and the power number of the second turbine blade was 0.8.

In the HOMOMIC-LINE FLOW, the turbine blade was provided at one stage and the power number was 0.8.

TABLE 1

| No. | first Reactor (Operation Conditions) | Second Reactor | Third Reactor | Na/OH Ratio in First Reactor | Viscosity Average[1] Molecular Weight in Outlet of First Reactor | NaOH in Outlet of Second Reactor (N) | Na$_2$CO$_3$ in Outlet of Third Reactor (mol/L) | Rate of Decomposi of Chloroform (wt %) |
|---|---|---|---|---|---|---|---|---|
| Example 1 | Line mixer (1.1 kW·hr/m$^3$) | Sulzer Mixer | Column type stirring vessel | 1.03 | 8500 | 0.28 | 0.03 | 2.1 |
| Example 2 | Sulzer Mixer (pressure drop 1.8 kg/cm$^2$) | Oriffice mixer | Same as above | Same as above | 6400 | 0.26 | 0.04 | 2.6 |

TABLE 1-continued

| | | | | | | | | |
|---|---|---|---|---|---|---|---|---|
| Example 3 | Stirring vessel (290 rpm) | Line mixer | Pot | same as above | 9700 | 0.27 | 0.04 | 2.4 |
| Example 4 | Line mixer (0.14 kW·hr/m³) (catalyst: two times that of Example 1) | Same as above | Same as above | Same as above | 10600 | 0.30 | 0.02 | 1.7 |
| Example 5 | Stirring vessel (290 rpm) (batchwise reaction) | — | — | Same as above (initial charged concentration) | 11100 (before addition of NaOH) | 0.27 | 0.03 | 2.2 |
| Example 6 | Line mixer (1.1 kw·hr/m³) | Line mixer | — | 1.03 | 8500 | 0.30 | 0.03 | 2.1 |

| No. | Temperature of Polymer Solution in Outlet of First Reactor (°C.) | Temperature of Polymer Solution in Outlet of Second Reactor (°C.) | Physical Properties | | | |
|---|---|---|---|---|---|---|
| | | | Final[3] Viscosity Average Molecular Weight | Molecular Weight Distribution (Mw/Mn) | Acetone[4] Extraction Amount (wt %) | Tone (YI) |
| Example 1 | 33 | 37 | 30500 | 2.11 | 1.4 | 2.6 |
| Example 2 | 31 | 36 | 30000 | 2.18 | 1.5 | 2.6 |
| Example 3 | 26 | 31 | 30200 | 2.14 | 1.5 | 2.6 |
| Example 4 | 34 | 37 | 29800 | 2.20 | 1.6 | 2.7 |
| Example 5 | 26 on the average | | 30200 | 2.17 | 1.5 | 2.7 |
| Example 6 | 33 | 39 | 30100 | 2.05 | 1.5 | 2.6 |

TABLE 2

| No. | First Reactor (Operation Conditions) | Second Reactor | Third Reactor | Na/OH Ratio in First Reactor | Viscosity Average[1] Molecular Weight in Outlet of First Reactor | NaOH in Outlet of Second Reactor (N) | $Na_2CO_3$ in Outlet of Third Reactor (mol/L) | Rate of Decompos of Chlorofo (wt % |
|---|---|---|---|---|---|---|---|---|
| Comparative Example 1 | Line mixer (0.005 kW·hr/m³) | Sulzer Mixer | Column type stirring vessel | 1.03 | 2400 | 0.20 | 0.10 | 7.9 |
| Comparative Example 2 | Same as above (3.8 kW·hr/m³) | Same as above | Same as above | Same as above | 19300 | 0.27 | 0.03 | 2.2 |
| Comparative Example 3 | Same as above (1.1 kw·hr/m³) | Same as above | Same as above | Same as above | 8300 | 0.02 | 0.03 | 2.3 |
| Comparative Example 4 | Same as above (1.1 kw·hr/m³) | Same as above | Same as above | 2.0 | 18800 | 0.81 | 0.11 | 8.6 |
| Comparative Example 5 | Stirring vessel (340 rpm) (no cooling) | Line mixer | Column type stirring vessel | 1.03 | 20200 | 0.19 | 0.06 | 4.7 |
| Comparative Example 6 | Stirring vessel (290 rpm) | — | — | 1.45 | 17700 | 0.26 | 0.11 | 8.6 |

| No. | Temperature of Polymer Solution in Outlet of First Reactor (°C.) | Temperature of Polymer Solution in Outlet of Second Reactor (°C.) | Physical Properties | | | |
|---|---|---|---|---|---|---|
| | | | Final[3] Viscosity Average Molecular Weight | molecular Weight Distribution (Mw/Mn) | Acetone[4] Extraction Amount (wt %) | Tone (YI) |
| Comparative Example 1 | 28 | 33 | 28400 | 2.34 | 2.0 | 3.1 |
| Comparative Example 2 | 38 | 38 | 24300 | 2.53 | 2.4 | 3.0 |
| Comparative Example 3 | 33 | 35 | 26700 | 2.45 | 2.3 | 3.2 |
| Comparative Example 4 | 33 | 39 | 28900 | 2.30 | 1.9 | 2.9 |
| Comparative Example 5 | 52 | 52 | 27800 | 2.37 | 2.1 | 3.3 |
| Comparative Example 6 | 26 on the average | | 27200 | 2.42 | 2.2 | 2.9 |

Note:
1. The reaction of the polymer solution in the outlet of the reactor was terminated by making the polymer solution acidic with nitric acid, and after water washing, the viscosity average molecular weight was measured.
2. The rate of decomposition of the chloroformate group was calculated from the equation shown below (based on the decomposition reaction shown below).

Decomposition Reaction

$$-COCl + 3NaOH \rightarrow -OH + Na_2CO_3 + NaCl$$

$$\frac{\text{Na}_2\text{CO}_3 \text{ Conc. (mol/L)} \times \text{Amount of Aqueous Layer (L/hr)} \times 100}{\text{Amount of Chloroformate Supplied (mol/hr)}}$$

3. The amount of the p-tert-butylphenol terminal group as a molecular weight modifier is constant. Thus, as the molecular weight distribution is narrower and the molecular weight is higher, the number of terminals in the polymer is smaller and the number of hydroxy terminals is smaller.

4. After the reflux extraction for 6 hours at the boiling point of acetone (56° C.), the acetone dissolved product was evaporated to a solid, and the weight percentage was measured.

What is claimed is:

1. A process for producing polycarbonate by reacting a polycarbonate oligomer and a phenol compound in the presence of caustic alkali, which process comprises introducing the polycarbonate oligomer, caustic alkali and the phenol compound, the equivalent ratio of alkali to hydroxyl group in the phenol compound (alkali/hydroxyl group) being 0.9:1 to 1.8:1, in a first reaction zone where polymerization is carried out to produce polycarbonate having a viscosity average molecular weight of 3,000 to 15,000, and then introducing a reaction mixture containing the polycarbonate as produced in the first reaction zone into a second reaction zone where polymerization is carried out while adjusting the alkali concentration in the second reaction zone to 0.05 to 0.7N by regulating caustic alkali supplied.

2. The process as claimed in claim 1, wherein after polymerization in the first reaction zone, caustic alkali is supplied to the first reaction zone to adjust the caustic alkali concentration to 0.05 to 0.7N.

3. The process as claimed in claim 1, wherein polymerizations in the first reaction zone and the second reaction zone are carried out in different reactors.

4. The process as claimed in claim 1, wherein polymerizations in the first reaction zone and the second reaction zone are carried out in the presence of a solvent.

5. The process as claimed in claim 1, wherein polymerization in the first reaction zone or the second reaction zone is carried out in a reactor selected from line mixer, orifice mixer, static mixer or stirring vessel.

6. The process as claimed in claim 1, wherein polymerization in the first reaction zone is carried out at a temperature of 10° to 50° C.

7. The process as claimed in claim 1, wherein polymerization in the second reaction zone is carried out at a temperature of 10° to 50° C.

8. The process as claimed in claim 1, wherein the polycarbonate oligomer has a number average molecular weight of 300 to 2,500.

* * * * *